(12) United States Patent
Keith

(10) Patent No.: US 10,716,287 B2
(45) Date of Patent: Jul. 21, 2020

(54) CANINE EMERGENCY RESCUE HARNESS

(71) Applicant: Stephen McClary Keith, Pembroke, NH (US)

(72) Inventor: Stephen McClary Keith, Pembroke, NH (US)

(*) Notice: Subject to any disclaimer, the term of this patent is extended or adjusted under 35 U.S.C. 154(b) by 338 days.

(21) Appl. No.: 15/814,862

(22) Filed: Nov. 16, 2017

(65) Prior Publication Data
US 2018/0192613 A1 Jul. 12, 2018

Related U.S. Application Data

(60) Provisional application No. 62/444,406, filed on Jan. 10, 2017.

(51) Int. Cl.
| | |
|---|---|
| *A01K 1/02* | (2006.01) |
| *A01K 27/00* | (2006.01) |
| *A45F 3/04* | (2006.01) |
| *A45F 3/14* | (2006.01) |

(52) U.S. Cl.
CPC ............ *A01K 1/029* (2013.01); *A01K 1/0263* (2013.01); *A01K 27/002* (2013.01); *A45F 3/04* (2013.01); *A45F 2003/146* (2013.01)

(58) Field of Classification Search
CPC .... A01K 1/029; A01K 1/0263; A01K 27/002; A45F 3/04; A45F 2003/146
See application file for complete search history.

(56) References Cited

U.S. PATENT DOCUMENTS

| | | | |
|---|---|---|---|
| 4,831,967 A | 5/1989 | Anderson | |
| 5,148,956 A * | 9/1992 | Funk | A01K 1/0263 119/725 |
| 5,644,902 A | 7/1997 | Kemp | |
| D424,248 S * | 5/2000 | Sommers | D30/109 |
| 6,286,461 B1 | 9/2001 | Martz | |
| 6,802,282 B2 † | 10/2004 | Muckleroy | |
| 7,353,779 B2 | 4/2008 | Altieri | |
| 8,474,412 B1 * | 7/2013 | Walden | A01K 1/0263 119/725 |
| 9,295,234 B2 * | 3/2016 | Shewfelt | A01K 27/002 |
| 10,349,622 B2 * | 7/2019 | Price | A01K 13/00 |
| 2008/0149673 A1 * | 6/2008 | Slater | A01K 1/0254 224/153 |
| 2011/0127309 A1 * | 6/2011 | Chua | A01K 1/029 224/600 |
| 2018/0139921 A1 * | 5/2018 | Kath | A01K 1/029 |

OTHER PUBLICATIONS https://www.rocknrescue.com/product/mr-dog-harness, at least as early as Dec. 22, 2016, 2 pages.

* cited by examiner
† cited by third party

*Primary Examiner* — Joshua D Huson
(74) *Attorney, Agent, or Firm* — Davis & Bujold, P.L.L.C.; Kimberly Peaslee

(57) ABSTRACT

A canine emergency rescue harness having at least a pair of straps and mating strap holes or loops. The harness may be constructed from a unitary piece of lightweight and strong material. The harness having a pair of front leg holes and a pair of rear leg holes for accommodating a dog's limbs. The harness being designed to balance a dog on a human's back for transport. The harness may be used in a hands-free manner with the use of secondary straps connected to the primary carrying straps using connectors, such as loops, triglides, and the like.

17 Claims, 3 Drawing Sheets

CANINE EMERGENCY RESCUE HARNESS

CROSS REFERENCE TO RELATED APPLICATION

This application claims priority from U.S. Provisional Application Ser. No. 62/444,406, filed Jan. 10, 2017; the disclosure of which is incorporated herein by reference in its entirety.

FIELD OF THE DISCLOSURE

The present disclosure relates to canine harnesses and more particularly to a canine harness for use when rescuing an injured canine in an emergency.

BACKGROUND OF THE DISCLOSURE

There are several types of conventional dog harnesses. Some harnesses are used for walking a dog and to prevent pulling, and others are used for carrying a dog in a vehicle. Yet other conventional harnesses include those that are designed to allow a dog to carry its own food or water, or the like.

One example of an existing dog harness is found in U.S. Pat. No. 5,644,902. There, a dog pack harness is designed to be used by a dog for carrying one or more packs with gear, food and/or water, or other supplies. The harness has numerous straps and buckles and requires proper fitting to keep the pack in position on the dog's back when in use.

Next, a pet carrier is disclosed in U.S. Pat. No. 6,286,461. The pet carrier is rigid and is designed to carry only a small dog or cat. The pack is bulky and heavy and is essentially a small animal crate with straps and is designed to be used only briefly over the arm or on the back of a person and then rest upright in a seat for travel in a car, a plane, a bus, or the like. Similarly, a lift frame for use in transporting larger dogs is disclosed in U.S. Pat. No. 4,831,967. There, a sling with a series of rails and chains is used to move an injured animal within a veterinary facility. It is basically a hoist and is very heavy and bulky and requires additional equipment, including at least a pulley system to lift and move an injured animal across short distances like an operating room.

Another existing dog harness is used for rappelling and is shown in U.S. Pat. No. 7,353,779. There a harness with numerous straps and buckles is taught for use in military and civilian applications where a dog is disembarking from a helicopter or is scaling a cliff and the human user is actively belaying or climbing, for example. Because of the sophistication and training of the user and the specific application, numerous buckles and specially designed strap systems are used. Additionally, the repelling harnesses are designed to be strong and suitable for a specific application, and not necessarily lightweight or easy to use by a layman.

Wherefore it is an object of the present disclosure to overcome the above mentioned shortcomings and drawbacks associated with the prior art harnesses and provide for a harness specifically designed to be carried at all times so that in the event of an emergency a layman can very quickly use the harness without the need to adjust the harness to fit a dog that is in distress and then transport the dog to safety. Alternatively, the harness may be used when encountering a steep area, or ladder portion, of a hiking trail so that the dog can continue hiking through on the particular trail without having to be diverted off trail as the steep area would otherwise be impassable to a dog.

SUMMARY OF THE DISCLOSURE

One aspect of the present disclosure is a canine emergency rescue harness comprising a harness body having a having a first edge, a second edge, a first side, and a second side, the first side having a first dart to create a first contour and the second side having a second dart to create a second contour; a pair of spaced apart carrying straps extending away from the first edge of the body; a pair of mating strap holes or loops for engaging with the pair of spaced apart carrying straps when carrying a canine and located adjacent to and spaced from the second edge of the body; a pair of spaced apart rear leg holes located adjacent to and spaced from the first side of the body; and a pair of spaced apart front leg holes located adjacent to and spaced from the second side of the body, the rear leg holes being larger than the front leg holes to form a harness configured to secure a canine on a human's back for transport.

One embodiment of the canine emergency rescue harness further comprises reinforcement of the pair of mating strap holes or loops. Another embodiment of the canine emergency rescue harness further comprises reinforcement of the pair of front leg holes, reinforcement of the pair of rear leg holes and/or reinforcement of the pair of carrying straps.

Certain embodiments of the canine emergency rescue harness are wherein the harness comprises rip-stop fabric. In some cases, the harness is at least partially reflective.

In another embodiment of the canine emergency rescue harness, the harness weighs less than a pound. In some cases, the harness weighs less than 10 ounces. In certain embodiments, the canine emergency rescue harness further comprises secondary straps for connecting to the carrying straps to provide for hands-free use of the harness. In certain cases, the canine emergency rescue harness further comprises a carrying bag.

Another aspect of the present disclosure is a canine emergency rescue harness comprising a harness body having a having a first edge, a second edge, a first side, and a second side, the first side having a first dart to create a first contour and the second side having a second dart to create a second contour; a pair of spaced apart carrying straps extending away from the first edge of the body, wherein the spaced apart carrying straps each have a connecter at a free end; a pair of mating strap holes or loops for engaging with the pair of spaced apart carrying straps when carrying a canine and located adjacent to and spaced from the second edge of the body; a pair of spaced apart rear leg holes located adjacent to and spaced from the first side of the body; a pair of spaced apart front leg holes located adjacent to and spaced from the second side of the body, the rear leg holes being larger than the front leg holes to form a harness configured to secure a canine on a human's back for transport; and a pair of spaced apart secondary straps extending away from the body wherein each of the pair of spaced apart secondary straps is located between either the pair of spaced apart front leg holes or the pair of spaced apart rear leg holes, each of the secondary straps being connectable with a mating connector at the free end of each of the carrying straps to provide hands-free use of the harness.

One embodiment of the canine emergency rescue harness further comprises reinforcement of the pair of mating strap holes or loops. In some cases, the canine emergency rescue harness further comprises reinforcement of the pair of front leg holes, reinforcement of the pair of rear leg holes, and/or reinforcement of the pair of carrying straps and/or the pair of secondary straps.

Another embodiment of the canine emergency rescue harness is wherein the harness comprises rip-stop fabric. In some cases, the harness is at least partially reflective.

Yet another embodiment of the canine emergency rescue harness is, wherein the harness weighs less than 10 ounces. In certain embodiments, the connectors comprise buckles, single or double loops, or triglides manufactured from materials including metal and durable plastics.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

The canine emergency rescue harness of the present disclosure is designed for use by hikers, backpackers, and every-day dog walkers in an emergency evacuation situation. The harness is ultra-light, strong, and is a one piece unit that is designed to cradle a dog while using pressure, leverage, and balance to safely hold a dog on a human's back as the harness disperses the weight of the dog onto the human's shoulders, much like a backpack.

Certain embodiments of the canine emergency rescue harness are designed to fold down to a size that is smaller than a 12 ounce can, when not in use, and weigh less than a pound. In some cases, the harness will weigh about 8 ounces. This makes the harness practical to keep in a pocket, a backpack, a purse, and the like. This provides a dog owner with piece of mind and the ability always have the harness close at hand in an emergency.

The canine emergency rescue harness of the present disclosure has a simple, one-piece design that makes the harness both quick and easy to get a dog into the harness without having to deal with numerous straps, buckles, clips, hooks, and the like, and there is no need to struggle with loosening, tightening, or constantly checking on multiple fittings when in a stressful situation with an injured animal. The design of the harness provides the dog with a safe and secure way to be transported to medical care following an injury. By having a lightweight and simple-to-use design a dog owner can have confidence in the fact that they can safely transport their companion to safety no matter how remote the location of injury.

The canine emergency rescue harness of the present disclosure may also be used by military personal for mobilizing a canine officer in the field. In this particular application, the ability to quickly harness the dog and mount the harness to a soldier's back provides for a quick evacuation when under fire, while providing the soldier with hands-free use so that they can take advantage of other equipment and can also provide cover during an evacuation. If the soldier did not have access to the harness of the present disclosure they may need to physically carry the canine and not be able to defend against incoming fire or would need to leave the canine to evacuate an area without the soldier's assistance risking the canine's safety.

The canine emergency rescue harness of the present disclosure is designed to use the pressure of a dog's weight to keep the dog secure in the cradled design of the harness. The built in shoulder straps "lock" the dog into the harness so the dog cannot fall out of the harness when it is in use. In certain embodiments, hands-free use is also provided via the use of additional straps.

Figure 1:
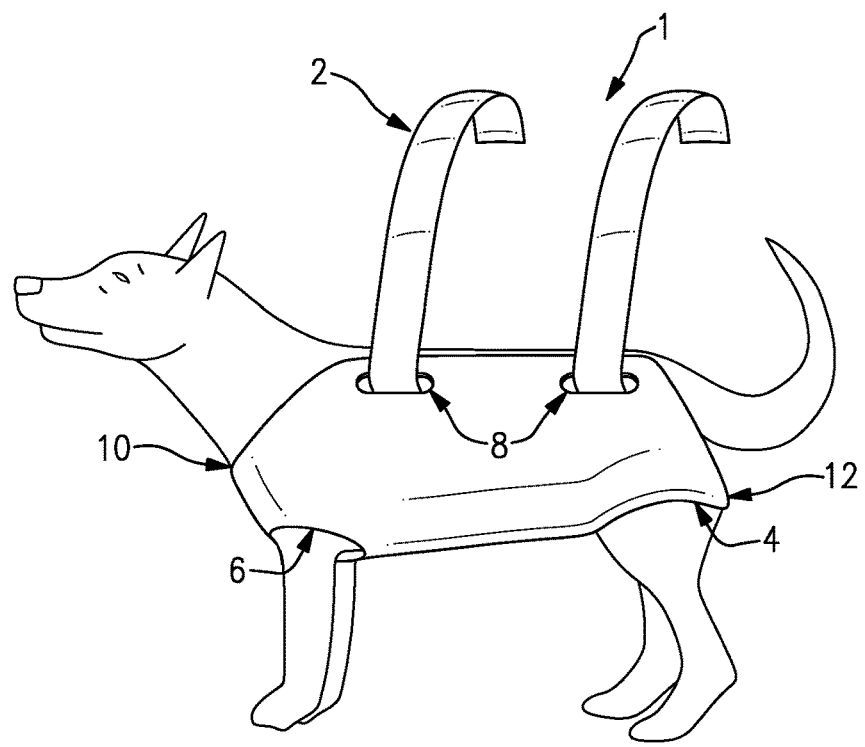
FIG. 1 shows one embodiment of the canine emergency rescue harness of the present disclosure on a dog.

Referring to FIG. 1, one embodiment of the canine emergency rescue harness of the present disclosure is shown on a dog. More specifically, the canine emergency rescue harness 1 has two straps 2 which thread through a pair of strap holes, or strap loops, 8 to hold a dog securely for transport. The canine emergency rescue harness 1 has a pair of rear leg holes 4 and a pair of front leg holes 6 to accommodate the dog's limbs. There is also a region in the front of the harness 10 that is designed to create a curvature for better fitting a dog's body, and there is a similar region in the rear of the harness 12 that is designed to create a curvature for the same purpose. In certain embodiments, the harness may be also sized to accommodate giant breeds and/or sized to fit medium sized dogs.

Figure 1A:
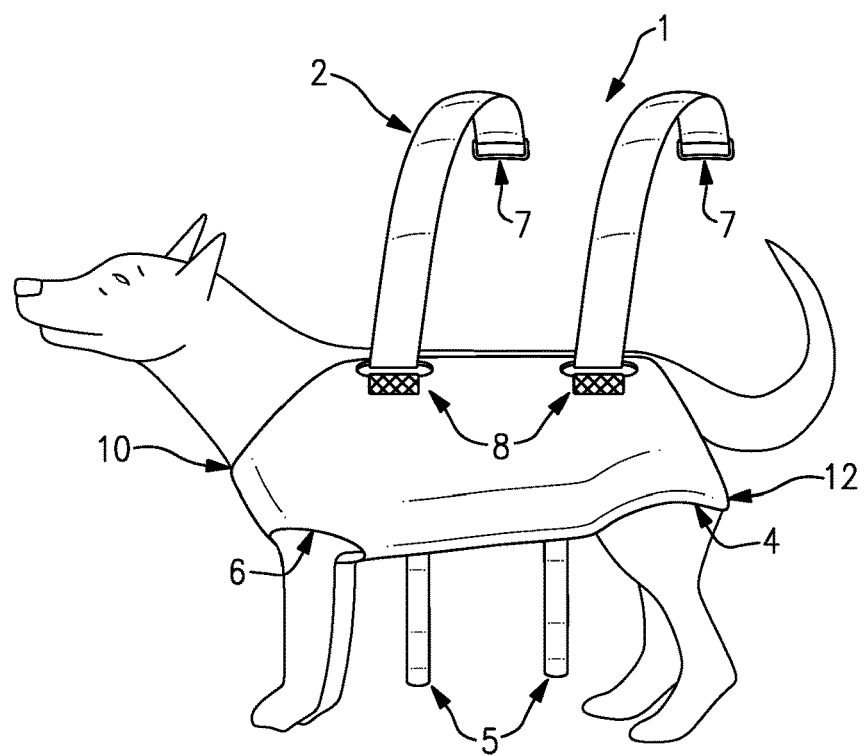
FIG. 1A shows one embodiment of the canine emergency rescue harness of the present disclosure on a dog.

Referring to FIG. 1A, one embodiment of the canine emergency rescue harness of the present disclosure is shown on a dog. More specifically, the canine emergency rescue harness 1 has two primary straps 2 which thread through a pair of strap holes, or strap loops, 8 to hold a dog securely for transport. The canine emergency rescue harness 1 has a pair of rear leg holes 4 and a pair of front leg holes 6 to accommodate the dog's limbs. There is also a region in the front of the harness 10 that is designed to create a curvature for better fitting a dog's body, and there is a similar region in the rear of the harness 12 that is designed to create a curvature for the same purpose. In certain embodiments, the harness includes two secondary straps 5 which thread through strap loops 7 to secure the dog in the harness to the user's back in a hand-free manner. In certain embodiments, the secondary straps are positioned and sized so they can be easily reached when the dog is on the user's back. By securing the secondary straps to the primary straps the harness is secured to the user. In other embodiments, the primary straps 2, may be connectable to a user's back pack, or clothing, or simply tied together to secure the harness to the user.

Figure 2A:
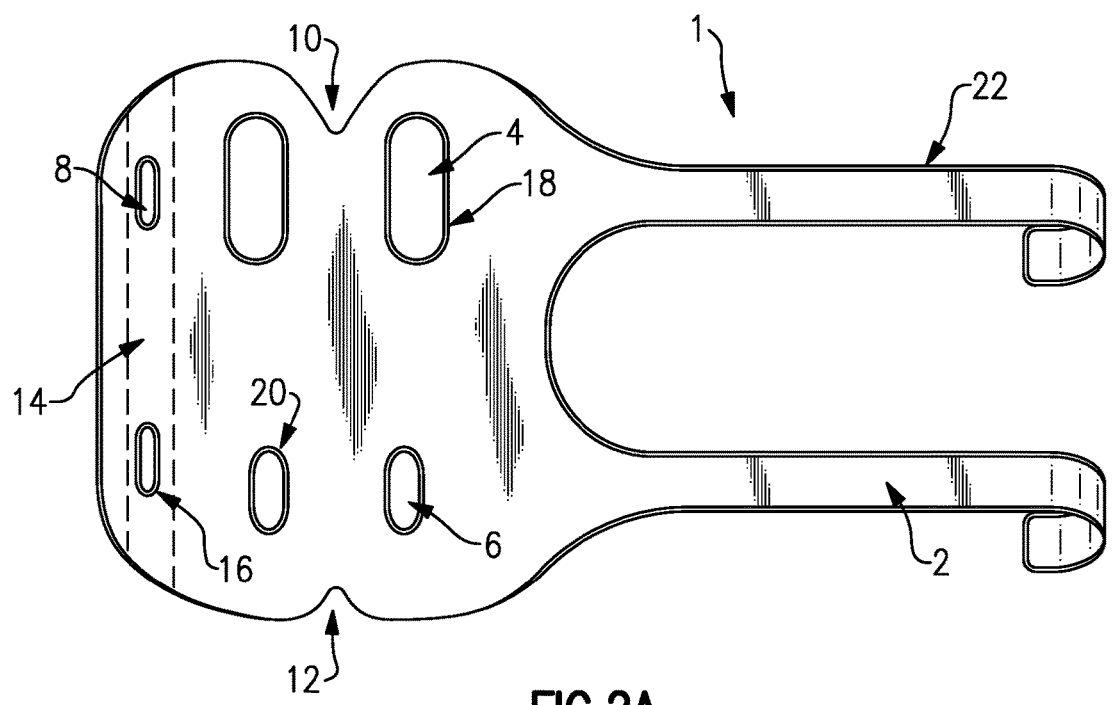
FIG. 2A shows an embodiment of the canine emergency rescue harness of the present disclosure.

Referring to FIG. 2A, one embodiment of the canine emergency rescue harness of the present disclosure is shown. More specifically, the canine emergency rescue harness 1 has two straps 2. These two straps can be made of the same material as the remainder of the harness, or can be made from different material depending on the specific application. The two straps 2 thread through a pair of strap holes, or strop loops, 8 to secure a dog for transport. In some cases, the strap holes or loops 8 can be reinforced 16 with additional stitching, additional fabric, or the like. In certain embodiments, the strap loops comprise welded steel rings, or the like. In certain embodiments of the canine emergency rescue harness 1, there is reinforcement 14 along the region where the strap holes or loops are located. This reinforcement 14 can be with additional stitching, additional fabric, or the like. In some cases, the harness itself has reinforced edges 22 that can consist of a hem, additional fabric, additional stitching, or the like.

It is important that the canine emergency rescue harness 1 is strong and can support the weight of an animal, but that it is also lightweight to provide for ease of stowing and carrying. This is particularly true if the harness is to be used by a through hiker, or the like, where the weight and volume of equipment is of particular concern.

The canine emergency rescue harness has a pair of rear leg holes 4 and a pair of front leg holes 6 to accommodate a dog's limbs. In certain embodiments, the rear leg holes 4 have reinforced edges 18 that can consist of a hem, additional fabric, additional stitching, or the like. And, in some cases the front leg holes 6 have reinforced edges 20 that can consist of a hem, additional fabric, additional stitching, or the like.

In one embodiment of the harness disclosed herein, there is a region in the front of the harness 10 that is designed to create a curvature for better fitting a dog, and there is a similar region in the rear of the harness 12 that is designed to create a curvature for the same purpose. During manufacture, darts are cut out of the piece of fabric 10, 12 to make a cradle shape to better hold the dog when on a human's back. It is understood that the leg holes 4, 6 are positioned to better hold the dog comfortably in the harness. The positioning helps for ease of carrying by a human by balancing the dog's weight and for securing the animal comfortably to prevent a feeling of distress when the dog is lifted. Dogs generally carry the majority of their weight toward the front half of their bodies and thus, in some cases, the rear leg holes are positioned closer to the rear edge of the harness than the front leg holes are positioned in relation to the front edge of the harness to compensate for the imbalance from front to back.

Figure 2B:
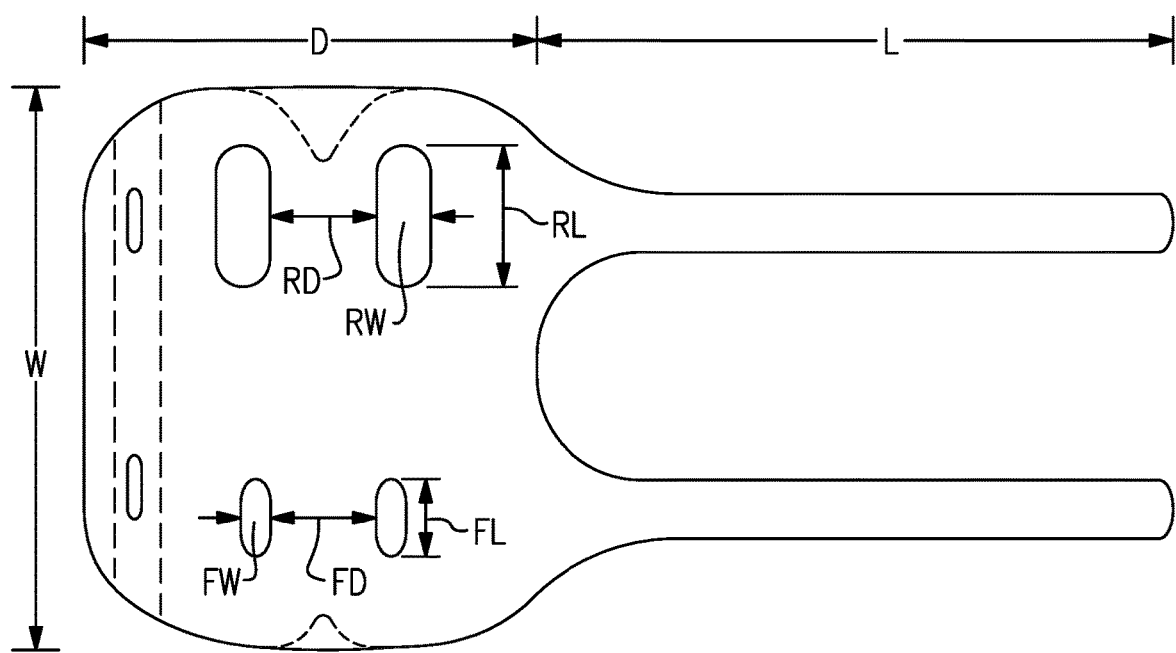
FIG. 2B shows an embodiment of the canine emergency rescue harness of the present disclosure.

Referring to FIG. 2B, one embodiment of the canine emergency rescue harness of the present disclosure is shown. More specifically, the harness can be sized to accommodate different sized animals. In some cases, the leg holes 4, 6 can be sized larger or smaller. In some cases, the straps 2 may be longer or shorter to accommodate different sized animals and/or different sized people. In some cases, secondary straps are used to provide for hands-free use of the harness (not shown). In certain embodiments, the width of the harness W is about 35 inches. In certain embodiments, the depth of the harness D is about 32 inches. In certain embodiments, the length of the harness straps L is about 28 inches. The width of the rear leg holes RW can be about 3 inches and the width of the front leg holes FW can also be about 3 inches. In certain embodiments, the length of the rear leg holes RL is about 10 inches and the length of the front leg holes FL is about 6 inches. In certain embodiments, the distance between the rear leg holes RD is about 5 inches and the distance between the front leg holes FD is about 4 inches. In some embodiments, the spacing S between the front leg holes 6 and the rear leg holes 4 is about 13 inches. It is understood that depending on the size of the dog breed (e.g., small, medium, large, great, or the like) the dimensions may change. It is also understood that a one size-fits-all harness is also possible.

Figure 3:
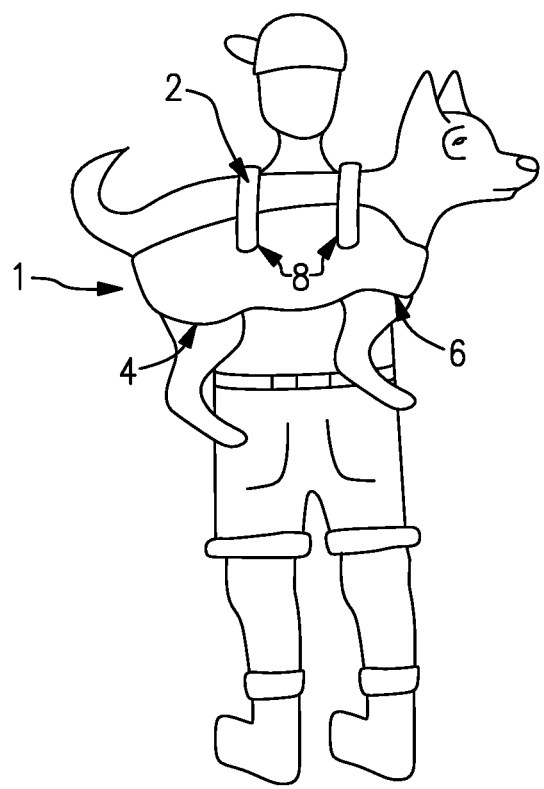
FIG. 3 shows one embodiment of the canine emergency rescue harness of the present disclosure on a dog that is being carried by a human.

Referring to FIG. 3, one embodiment of the canine emergency rescue harness of the present disclosure is shown on a dog being carried by a human. More specifically, the dog is in the rescue harness 1 and has its legs protruding from the front leg holes 6 and rear leg holes 4 to help hold it in position while being transported. The primary pair of straps 2 is threaded through corresponding strap holes, or loops, 8 to secure the dog in the harness. The person can then lift the dog onto his or her back and transport the dog to safety. In some cases, the primary straps are sized so that a person can hold the straps in front of them at a comfortable position (e.g., elbows at about 90 degrees). In some cases, the straps are sized so they can be tied around a hiking pole, or the like, and the pole can be held comfortably by a person as they carry the animal to safety. In yet other embodiments, the straps may be secured to a pack or some other harness worn by the person. This is a less favored option since this would likely disrupt the balance of any existing pack or harness. As noted above, in some cases, secondary straps are used to connect to the primary straps via connectors to provide for hands-free use of the harness. The secondary straps are not visible from this orientation.

In certain embodiments, the connectors may be buckles, quick release fasteners, single or double loops, triglides, and the like. In some cases, the connectors are manufactured using materials such as metal or durable plastics. In any case, the connectors need to be strong enough to hold the weight of a dog in the harness and are preferably durable such that temperature changes and the like do not adversely affect the life of the connector. In one embodiment, the use of two metal loops provides a simple and durable connection for use with the primary carrying straps and the secondary straps.

Figure 4:
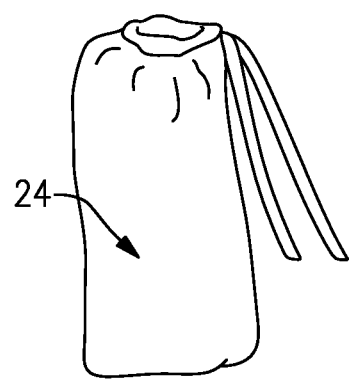
FIG. 4 shows one embodiment of a carrying case for an embodiment of the canine emergency rescue harness of the present disclosure.

Referring to FIG. 4, one embodiment of a carrying case for an embodiment of the canine emergency rescue harness of the present disclosure is shown. More particularly, the canine emergency rescue harness is designed to be sized and constructed to be lightweight and strong. One benefit of such a construction is the ease of carrying the harness regularly in case of an emergency. In one example, the harness is compact and fits inside a carrying case or bag 24 that is about the size of a can of soda. In some cases, the entire unit weighs less than a few ounces. In certain embodiments, the harness comprises rip-stop fabric. In some cases, the harness may be brightly colored or the harness may be partially, or entirely reflective.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:
1. A canine emergency rescue system comprising:
   a light weight unitary harness body having a first edge, a second edge, a first side, and a second side, the light weight unitary harness weighing less than a pound;
   a pair of spaced apart carrying straps extending away from the first edge of the harness body and configured to be engaged with the second edge of the harness body via strap holes or strap loops to surround a canine for transport by a single user;
a first pair of spaced apart leg holes located adjacent to and spaced from the first side of the body; and
a second pair of spaced apart leg holes located adjacent to and spaced from the second side of the body,
the carrying straps being dimensioned to act as shoulder straps, and secondary straps configured to be connected to the spaced apart carrying straps using strap loop connectors to provide for hands-free use of the light weight unitary harness configured to secure the canine on a the single user for transport.

2. The canine emergency rescue system of claim 1, further comprising reinforcement of the first pair of leg holes.

3. The canine emergency rescue system of claim 1, further comprising reinforcement of the second pair of leg holes.

4. The canine emergency rescue system of claim 1, further comprising reinforcement of the pair of carrying straps.

5. The canine emergency rescue system of claim 1, wherein the harness comprises rip-stop fabric.

6. The canine emergency rescue system of claim 1, wherein the harness is at least partially reflective.

7. The canine emergency rescue system of claim 1, wherein the harness weighs less than 10 ounces.

8. The canine emergency rescue system of claim 1, further comprising a carrying bag.

9. A canine emergency rescue harness, comprising:
a harness body having a having a first edge, a second edge, a first side, and a second side;
a pair of spaced apart carrying straps extending away from the first edge of the body configured to be engaged with the second edge of the harness body to surround a canine for transport, wherein the spaced apart carrying straps each have strap loop connecter at a free end;
a first pair of spaced apart leg holes located adjacent to and spaced from the first side of the body;
a second pair of spaced apart leg holes located adjacent to and spaced from the second side of the body, and
a pair of spaced apart secondary straps extending away from the harness body wherein each of the secondary straps is connectable with the strap loop connector at the free end of each of the carrying straps to provide hands-free use of the harness by a single user;
the carrying straps being dimensioned to act as shoulder straps, thereby forming a harness weighing less than a pound and being configured to secure a canine on a single user for transport.

10. The canine emergency rescue harness of claim 9, further comprising reinforcement of the pair of carrying straps.

11. The canine emergency rescue harness of claim 9, further comprising reinforcement of the first pair of leg holes.

12. The canine emergency rescue harness of claim 9, further comprising reinforcement of the second pair of leg holes.

13. The canine emergency rescue harness of claim 9, further comprising reinforcement of the pair of secondary straps.

14. The canine emergency rescue harness of claim 9, wherein the harness comprises rip-stop fabric.

15. The canine emergency rescue harness of claim 9, wherein the harness is at least partially reflective.

16. The canine emergency rescue harness of claim 9, wherein the harness weighs less than 10 ounces.

17. The canine emergency rescue harness of claim 9, wherein the connectors comprise buckles, single or double loops, or triglides manufactured from materials including metal and durable plastics.

\* \* \* \* \*